United States Patent [19]

Schnedecker

[11] 4,338,273
[45] Jul. 6, 1982

[54] PROCESS FOR THE PRODUCTION OF ALVEOLAR MODULES

[75] Inventor: Guy Schnedecker, Paris, France

[73] Assignee: Commissariat a l'Energie Atomique, Paris, France

[21] Appl. No.: 181,409

[22] Filed: Aug. 26, 1980

[30] Foreign Application Priority Data

Sep. 6, 1979 [FR] France .............................. 79 22310

[51] Int. Cl.³ .............................................. B29D 23/04
[52] U.S. Cl. ................................. 264/167; 156/244.13;
264/565; 264/177 R; 425/132; 425/381;
425/461; 425/465
[58] Field of Search ................. 264/177 R, 56, 59, 60,
264/167, 565, 173, 563-569; 425/461-467,
380-381, 132, 382 R, 133.1, 197-199, 133.5,
131.5; 156/244.12-244.14

[56] References Cited

U.S. PATENT DOCUMENTS

| 3,380,128 | 4/1968 | Cremer et al. ................... 425/382 R |
| 3,473,986 | 10/1969 | Hureau ................................ 264/167 |
| 3,559,252 | 2/1971 | Schmidt et al. ................. 425/382 R |
| 3,790,654 | 2/1974 | Bagley .............................. 264/56 |
| 3,824,196 | 7/1974 | Benbow et al. .................... 425/461 |
| 3,825,641 | 7/1974 | Barnett ............................. 264/565 |
| 3,887,741 | 6/1975 | Dwyer ............................ 264/177 R |
| 3,983,283 | 9/1976 | Bagley ............................ 264/177 R |
| 4,168,944 | 9/1979 | Morikawa et al. ................ 425/464 |

FOREIGN PATENT DOCUMENTS

1370281 10/1974 United Kingdom ............... 425/132

*Primary Examiner*—Jeffery R. Thurlow
*Attorney, Agent, or Firm*—Pearne, Gordon, Sessions, McCoy & Granger

[57] ABSTRACT

Process for the production of alveolar modules comprising rows of parallel channels, certain of which issue onto the sidewalls of the module, the process consisting of producing the module by extrusion using at least two independent systems each producing rows of identical channels, whereby the formation of one of the systems is interrupted when the row of channels being produced is to issue onto the sidewalls of the module.

The apparatus for performing this process comprises a first extrusion system incorporating first extrusion material supply means and a first spinneret complementary to the cross-section of the rows of channels issuing onto the sidewalls of the module and a second extrusion system incorporating second extrusion material supply means and a second spinneret complementary to the cross-section of the other rows of channels, the first and second supply means being controlled independently of one another.

7 Claims, 2 Drawing Figures

PROCESS FOR THE PRODUCTION OF ALVEOLAR MODULES

BACKGROUND OF THE INVENTION

The invention relates to a process for the production of alveolar or honeycomb-like modules comprising rows of parallel channels, certain of which issue onto the sidewalls of the module, as well as to an apparatus for performing this process.

Numerous industrial constructions and systems utilize alveolar modules comprising rows of parallel channels in which in general at least two different fluids flow. Modules of this type are in particular encountered in heat exchangers, as well as in ultrafiltration units.

In all these constructions, the fluid flow in adjacent channels have very small cross-sections. It is therefore difficult to separate these fluids during their introduction into the module and during the removal therefrom. In general, this separation is brought about by displacing the inlet and outlet from certain of the rows of channels with respect to the ends of the module, so as to give access to said rows of channels through the sidewalls of the module.

At present, alveolar modules of this type are manufactured in a number of stages. The first stage is constituted by the manufacture of the actual module, more particularly by extrusion. This first stage is followed by stages involving the machining of the ends of the module made either mechanically or ultra-sonically and this serves to give access to certain of the rows of channels by openings made in the outer sidewalls of the module. Thus, the manufacture of alveolar modules of this type is relatively long, difficult and costly. Moreover, in certain special applications, it is desirable that lateral access to certain of the rows of channels does not take place level with the ends of the modules and instead takes place in an area which is relatively remote from said ends.

BRIEF SUMMARY OF THE INVENTION

The invention relates to a process making it possible to manufacture alveolar modules in which certain of the rows of channels issue onto the sidewalls of the module, either level with the ends of the latter, or in an area remote from said ends. This process is particularly simple, rapid and easy to perform, because it involves a single stage only which is superimposed on the extrusion stage in conventional production processes. The invention also relates to an apparatus which is particularly well suited for the realisation of this process.

According to the invention, this object is achieved by a process for the production of alveolar modules comprising rows of parallel channels, certain of which issue onto the sidewalls of the module, wherein it consists of producing the module by extrusion using at least two independent systems, each producing rows of identical channels, whereby the formation of one of the systems is interrupted when the rows of channels being produced is to issue onto the sidewalls of the module. Preferably, the channels have a square or rectangular cross-section.

According to a first constructional variant of the invention, each system produces by extrusion the lateral and transverse walls of the rows of corresponding channels.

According to a second constructional variant of the invention a first of said systems produces by extrusion of transverse walls of the rows of channels which are to issue onto the sidewalls of the module and the second system produces by extrusion the lateral and transverse walls of the other rows of channels.

The invention also relates to an apparatus for performing this process, wherein it comprises a first extrusion system incorporating first extrusion material supply means and a first spinneret complementary of the cross-section of the rows of channels issuing onto the sidewalls of the module and a second extrusion system incorporating second extrusion material supply means and a second spinneret complementary of the cross-section of the other rows of channels, the first and second supply means being controlled independently of one another.

According to another feature of the invention, the second spinneret is displaced relative to the first spinneret in the direction defined by the parallel channels of the module to be produced.

According to a preferred embodiment of the invention, the extrusion material supply means incorporate in each case a press plunger which forces the extrusion material through the corresponding spinneret.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
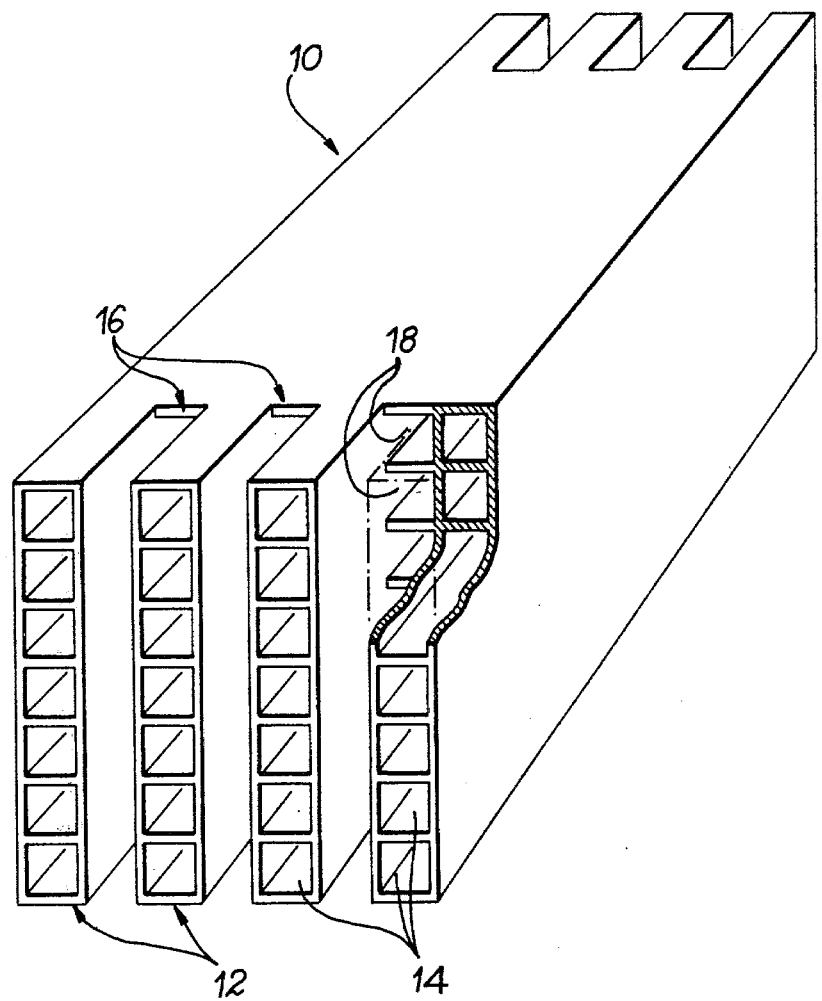
FIG. 1: a perspective view of an alveolar module produced according to the process of the invention.

The alveolar module of FIG. 1 is designated by the general reference numeral 10 and comprises rows 12 of parallel channels 14 in which flow a first fluid and rows 16 of parallel channels 18 in which flows a second fluid. The channels 14 and 18 are linear and parallel to one another and extend longitudinally in module 10 so as to issue at each of the ends of the latter.

Channels 14 and 18 have a square cross-section (as shown in FIG. 1) or a rectangular cross-section and the dimensions of the sides of said channels do not exceed 3 mm. Consequently, the separation of the fluids circulating in channels 14 and 18 level with the ends of module 10 causes problems which are generally solved by displacing the ends of the rows of channels 16 relative to the rows of channels 12 so as to permit the fluid circulating in rows of channels 16 to enter and leave via the sidewalls of module 10, whilst the fluid circulating in rows of channels 12 is introduced and removed by the ends of said module.

According to the invention, the displacements between the ends of the rows of channels 12 and 16 are obtained directly during the manufacture by extrusion of module 10 and no longer by supplementary machining as was hitherto necessary.

Figure 2:
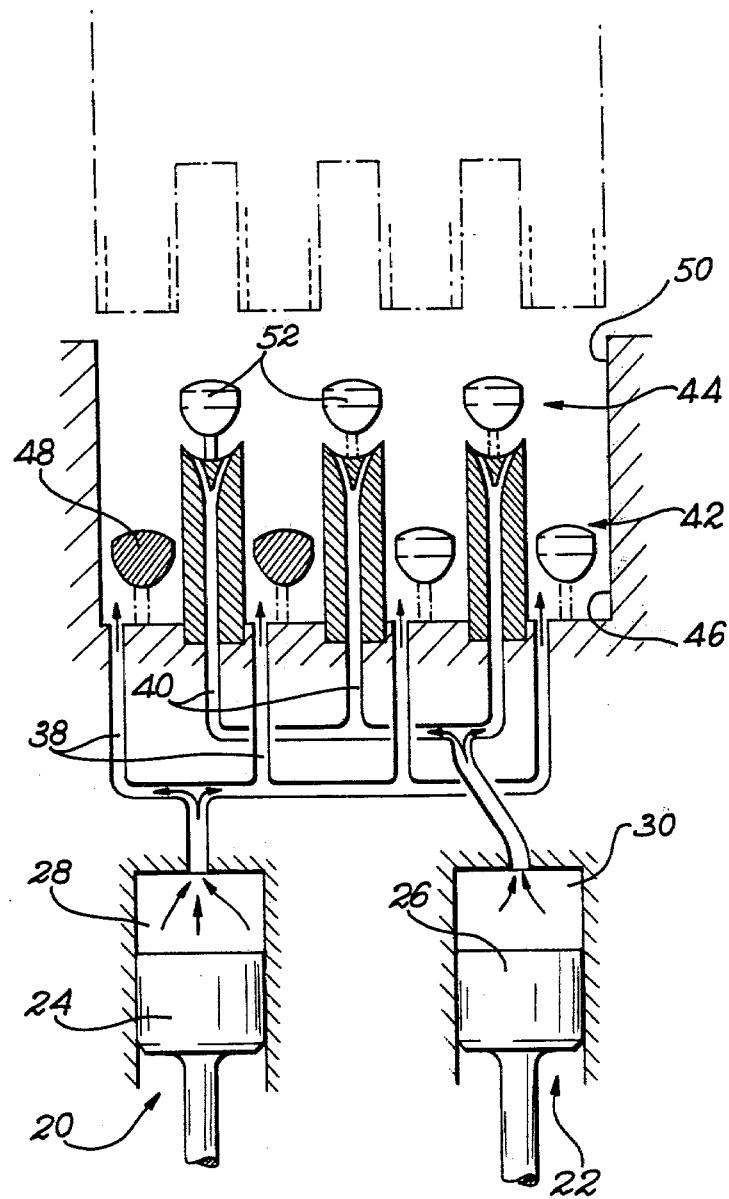
FIG. 2: a diagrammatic view showing an apparatus permitting the production of the alveolar module of FIG. 1.

As illustrated in FIG. 2, this result is obtained by manufacturing the module by extrusion by means of an apparatus incorporating two independent extrusion systems 20 and 22 respectively forming the rows of channels 12 and 16 of the module.

More specifically, each of the systems 20 and 22 comprises independent extrusion material supply means constituted in the present embodiment by two plungers 24 and 26. Each of the plungers 24 and 26 varies the volume of a chamber 28, 30, into each of which the extrusion material is previously introduced in the form of a spinning bar. The reduction in the volume of each of the chambers 28 and 30 caused by the displacement of plunger 24, 26 drives the paste-like extrusion material into passages 38, 40 issuing respectively into two spinnerets 42 and 44.

Spinneret 42 produces by extrusion rows of channels 12 and to this end comprises the same number of separate parts as the module to be produced has rows of channels 12. Each part of the spinneret 42 defines sidewalls 46 and not shown ends defining in cross-section a rectangular shape, whose dimensions correspond to the dimensions of each row of channels, plus the thickness of the walls of said channels. Spinneret 42 also has masks or covers 48 serving to produce the actual channels 14.

Spinneret 44 is displaced with respect to spinneret 42 in the direction defined by the parallel channels of the module to be produced. It essentially comprises rectangular outer walls 50 extending the outer walls 46 of spinneret 42 corresponding to the outer sidewalls of module 10. Spinneret 44 also has masks or covers 52, whose dimensions correspond to the internal dimensions of channels 18.

According to a first constructional variant of the invention (not shown) each of the spinnerets 42 and 44 serves both to produce the lateral and transverse walls of the rows of channels 12 and 16 respectively. To this end, the spacing between the lateral walls 46 of two parts of the spinneret 42 for producing two adjacent rows 12 exceeds the width of masks 52 of the second spinneret 44 by a value corresponding to the thickness of each of the lateral walls of the row of channels 16 produced by spinneret 44 between said two rows of adjacent channels 12. This variant has the disadvantage of varying the thickness of the walls separating adjacent channels 14 and 18, depending on whether channels 18 do or do not issue onto the sidewalls of the module.

For this reason and in accordance with a second embodiment of the invention shown in FIG. 2, the width of the mask 52 of the second spinneret 44 is preferably equal to the distance separating the walls 46 of two parts of the spinneret 42 producing two adjacent rows of channels 12. As a result, spinneret 44 only produces the transverse walls of the rows of channels 16, i.e. the walls separating each of the channels 18 of one and the same row. The thickness of the walls separating adjacent channels 14 and 18 is then constant within the module 10.

In one or the other of these embodiments, the thickness of the walls is between $100\mu$ and $200\mu$.

The alveolar module of FIG. 1 is produced by means of the apparatus of FIG. 2 in the following manner. Each of the extrusion systems 20 and 22 can be used independently of one another in such a way that the manufacture of the module can be carried out, for example, by using only the plunger of system 20 in order to displace the pasty material in chamber 28 through passages 38 up to the spinneret 42 in such a way as to form rows of channels 12 separated from one another by a distance corresponding to the width of the channels in the represented variant.

The extruded paste reaching the level of spinneret 44 is sufficiently cool to prevent it flowing or creeping level therewith and the plunger 26 of the second system 22 can then be put into operation in order to displace through passages 40 the pasty material in chamber 30 towards spinneret 44. This controls the formation of the transverse walls of the channels 18 connecting the adjacent rows of channels 12 and in this way forming said channels 18. Obviously, if the material extruded by the first spinneret 42 is sufficiently cool on reaching the spinneret 44 to prevent any creep or flow thereof, its temperature is still sufficiently high for the bond or connection between the transverse walls of channels 18 and the rows of channels 12 to be correctly effected.

According to the invention, when the rows of channels 16 have to issue onto the sidewalls of module 10, it is merely necessary to interrupt the plunger 26 of extrusion system 22 to ensure that the pasty material in chamber 30 is no longer moved towards spinneret 44 by passages 40. Thus, only the rows of channels 12 continue to be produced by extrusion by means of system 20. The rows of channels 16 or 12 can then issue onto the sidewalls of the module at any point.

The extrusion material used can be constituted by any conventional extrusion material which complies with the conditions of use of the manufactured cell. Preferably, this material is constituted by metallic oxide particles, such as alumina, magnesia, titanium dioxide and silica and these are coated, for example, with organic binders and preferably thixotropic binders such as the mixture of seresine and terpinol. Other binders, such as water-based binders, particularly of the tragacanth type for thermoplastic binders can also be used.

The material can also be formed from another substance such as a mixed oxide, a flouride and in particular an alkaline earth fluoride, or a metal powder. The constituent is mixed in per se known manner with an appropriate binder, so that the physical characteristics of the mixer are well adapted to the extrusion conditions.

Obviously, the invention is not limited to the embodiment described hereinbefore and in fact numerous variants thereof are possible. Thus, the extrusion apparatus can have the same number of independent systems as there are rows of different parallel channels in the module to be produced and the extrusion material supply means, together with the spinnerets of each system can be modified and replaced by any known equivalent means.

Moreover, the rows of channels of different types do not necessarily alternate as in the represented embodiment and the rows of channels which issue at the end of the module by one of their ends can issue onto the walls of the modules by their other ends, provided that the spinneret of each of the extrusion systems produces both the lateral and transverse walls of the corresponding rows of channels according to the first constructional variant described hereinbefore.

What is claimed is:
1. A process for the production of alveolar modules comprising rows of parallel channels, certain of which issue onto the sidewalls of the module, wherein it consists of producing the module by extrusion using at least two independent systems, each producing rows of identical channels, whereby the formation of one of the systems is interrupted when the rows of channels being produced is to issue onto the sidewalls of the module.

2. A process according to claim 1, wherein the channels have a square or rectangular cross-section.

3. A process according to claim 2, wherein each system produces by extrusion the lateral and transverse walls of the corresponding rows of channels.

4. A process according to claim 2, wherein a first of said systems produces by extrusion the transverse walls of the rows of channels which are to issue onto the sidewalls of the module and the second system produces by extrusion the lateral and transverse walls of the other rows of channels.

5. An apparatus for producing alveolar modules having rows of parallel channels, certain of which issue onto the sidewalls of the module, comprising a first extrusion system incorporating first extrusion material supply means and a first spinneret complementary of the cross-section of the rows of channels issuing onto the sidewalls of the module, a second extrusion system complementary of the cross-section of the other rows of channels, the first and second supply means being controlled independently of one another, and means for interrupting extrusion by one of said extrusion systems when the rows of channels being produced by said one extrusion system are to issue onto the sidewalls of the module.

6. An apparatus according to claim 5, wherein the second spinneret is displaced relative to the first spinneret in the direction defined by the parallel channels of the module to be produced.

7. An apparatus according to either of the claims 5 or 6, wherein the extrusion material supply means in each case comprise a plunger press which forces the extrusion material through the corresponding spinneret.

* * * * *